United States Patent
Yap et al.

(10) Patent No.: US 8,030,988 B2
(45) Date of Patent: Oct. 4, 2011

(54) METHOD FOR GENERATING MULTIPLE INCREMENTAL OUTPUT VOLTAGES USING A SINGLE CHARGE PUMP CHAIN

(75) Inventors: Swee Kiat Yap, Singapore (SG); Olivier Le-Briz, Saint-Gervais (FR); Sze-Kwang Tan, Singapore (SG)

(73) Assignees: STMicroelectronics Asia Pacific Pte. Ltd., Singapore (SG); STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 12/651,291

(22) Filed: Dec. 31, 2009

(65) Prior Publication Data

US 2011/0156803 A1  Jun. 30, 2011

(51) Int. Cl.
    *G05F 1/10* (2006.01)
(52) U.S. Cl. .......................................... 327/536; 363/60
(58) Field of Classification Search .................. 327/536; 363/59–60
    See application file for complete search history.

(56) References Cited

U.S. PATENT DOCUMENTS

| | | | | |
|---|---|---|---|---|
| 5,777,317 A | * | 7/1998 | Maki | 250/208.1 |
| 6,297,687 B1 | * | 10/2001 | Sugimura | 327/536 |
| 6,307,425 B1 | * | 10/2001 | Chevallier et al. | 327/536 |
| 6,359,798 B1 | * | 3/2002 | Han et al. | 363/60 |
| 6,404,272 B2 | * | 6/2002 | Zanuccoli et al. | 327/536 |
| 6,483,282 B1 | * | 11/2002 | Bayer | 323/315 |
| 6,717,829 B2 | * | 4/2004 | Appeltans | 363/59 |
| 6,791,212 B2 | * | 9/2004 | Pulvirenti et al. | 307/113 |
| 7,176,747 B2 | * | 2/2007 | Lee et al. | 327/536 |
| 2008/0143401 A1 | * | 6/2008 | Rai et al. | 327/157 |
| 2009/0097285 A1 | * | 4/2009 | Cook et al. | 363/60 |
| 2009/0121780 A1 | * | 5/2009 | Chen et al. | 327/536 |

* cited by examiner

*Primary Examiner* — Thomas J Hiltunen
(74) *Attorney, Agent, or Firm* — David V. Carlson; Lisa K. Jorgenson

(57) ABSTRACT

A method and apparatus for generating multiple voltage level outputs from a single series of charge pump stages. The apparatus includes a plurality of voltage output circuits electrically connected in series. A selected number of the voltage output circuits include voltage output nodes that are available to be connected to loads. A control component in each voltage output circuit regulates operation of the charge pump stages within that circuit to provide a voltage level at the voltage output node regulated independently of other voltage output circuits in the series. The method and apparatus has the advantage of reducing the number of charge pump stages required to achieve a plurality of different voltage output levels. In another embodiment, the method and apparatus recycles charge within the apparatus by transferring charge between voltage output circuits through a load.

14 Claims, 6 Drawing Sheets

METHOD FOR GENERATING MULTIPLE INCREMENTAL OUTPUT VOLTAGES USING A SINGLE CHARGE PUMP CHAIN

BACKGROUND

1. Technical Field

This description generally relates to the field of electrical circuits and, in particular, to the design of charge pump circuits.

2. Description of the Related Art

Charge pumps are used to generate high bias voltages from a single low voltage supply. In the prior art, a typical charge pump consists of charge pump stages electrically connected in series with one another to form a chain. For applications where more than one bias voltage is needed, a separate charge pump chain is used to produce each of the required output voltages, each chain starting from the same single supplied voltage.

FIG. 1 shows an example of a typical charge pump chain 10. The charge pump chain 10 includes a plurality of charge pump stages 12-1, 12-2, 12-3, 12-4, a control component 13, a comparator 14, and a capacitor 15. The charge pump stages 12-1, 12-2, 12-3, 12-4 are electrically coupled in series; the output voltage of one stage serving as the input voltage of the next stage. The comparator 14 has a first input connected to the output of the final charge pump stage 12-4 and a second input connected to a reference voltage. The comparator 14 has an output connected to an input of the control component 13. An output of the control component 13 is connected to each of the charge pump stages 12-1, 12-2, 12-3, 12-4. Each of the charge pump stages 12-1, 12-2, 12-3, 12-4 is also provided with the supplied input voltage $V_{dd}$.

The control component 13 controls the position of a switch within each of the charge pump stages 12-1, 12-2, 12-3, 12-4. The position of the switches controlled by the control component 13 is selected depending on the output of the comparator 14, which compares the output voltage at the final stage 12-4 against the reference voltage.

Within an individual charge pump stage, a capacitor, a diode, and a switch are electrically configured so that by controlling the position of the switch relative to the position of the switches in neighboring stages an input voltage $V_{dd}$ supplied to the stage is raised by an amount equal to $V_{dd}$. By electrically connecting a plurality of stages in series to form a chain, the supply voltage $V_{dd}$ at the input of the initial stage 12-1 is stepped up incrementally by an amount $V_{dd}$ at each stage. The overall output voltage for the charge pump chain 10 is taken at the output of the final stage 12-4 and equals $V_{dd}+(n*V_{dd})$, where n is the number of stages in the chain. The output at the final charge pump stage 12-4 is connected to ground through a decoupling capacitor 15, which smoothes the response of the output voltage as measured at the output of the final stage.

FIG. 1 also shows a charge pump typical in the prior art for an application requiring more than one output voltage level. In the prior art, to produce M output voltages, M number of charge pump chains is used. Each charge pump chain requires its own comparator and control circuitry to regulate the output voltage of that chain. In conventional charge pump designs, all M output voltages are produced starting from the same input voltage $V_{dd}$. A consequence of this design is that as applications with an increasing number of different voltage levels are needed, the number of chains and the number of stages needed increases. The increasing number of chains and stages leads to higher circuit complexity, the need for more wafer space on a semiconductor die, and higher power requirements.

BRIEF SUMMARY

According to one embodiment of the invention, an apparatus includes a plurality of voltage output circuits electrically connected in series. The voltage output circuits include one or more charge pump stages. An input to the initial voltage output circuit in the series is provided with an input voltage. An output of the final voltage output circuit in the series is an output node of the apparatus and is available to be connected to a load. One or more additional voltage output nodes are located at the output of selected voltage output circuits of the apparatus. The additional voltage output nodes are also available to be connected to loads.

At least one of the plurality of voltage output circuits includes a charge pump segment, a control component, a comparator, a voltage output node, a coupling capacitor, and a connection to ground. The charge pump segment includes one or more charge pump stages. The charge pump segment is connected to the input and output of the voltage output circuit and to a provided input voltage. The charge pump segment, the voltage output node, the comparator, and the control component are electrically coupled in a series loop. The comparator also has an input connected to a reference voltage and the voltage output node is connected to ground through a coupling capacitor.

The control component regulates operation of the charge pump segment according to the output of the comparator, which compares the voltage at the voltage output node with the reference voltage. The charge pump segment raises the voltage from the input to the output of the voltage output circuit by an incremental multiple of the input voltage. The coupling capacitor sinks or sources charge over short time intervals to dampen temporary fluctuations in voltage at the voltage output node.

The plurality of voltage output nodes of the apparatus provide regulated voltage sources at multiple voltage levels from a single voltage input level. In one embodiment, the plurality of voltage output nodes reduces the number of charge pump stages required to achieve a selection of voltage output levels. This embodiment has the benefit of reducing the area required on a wafer to provide a number of voltage levels.

In another embodiment in which a load is connected between at least two voltage output nodes, the apparatus recycles charge within the apparatus by transferring charge between voltage output circuits through the load. This embodiment reduces the charge that must be passed though lower voltage output circuits in the series to support higher voltage level output circuits.

DETAILED DESCRIPTION

Figure 1:
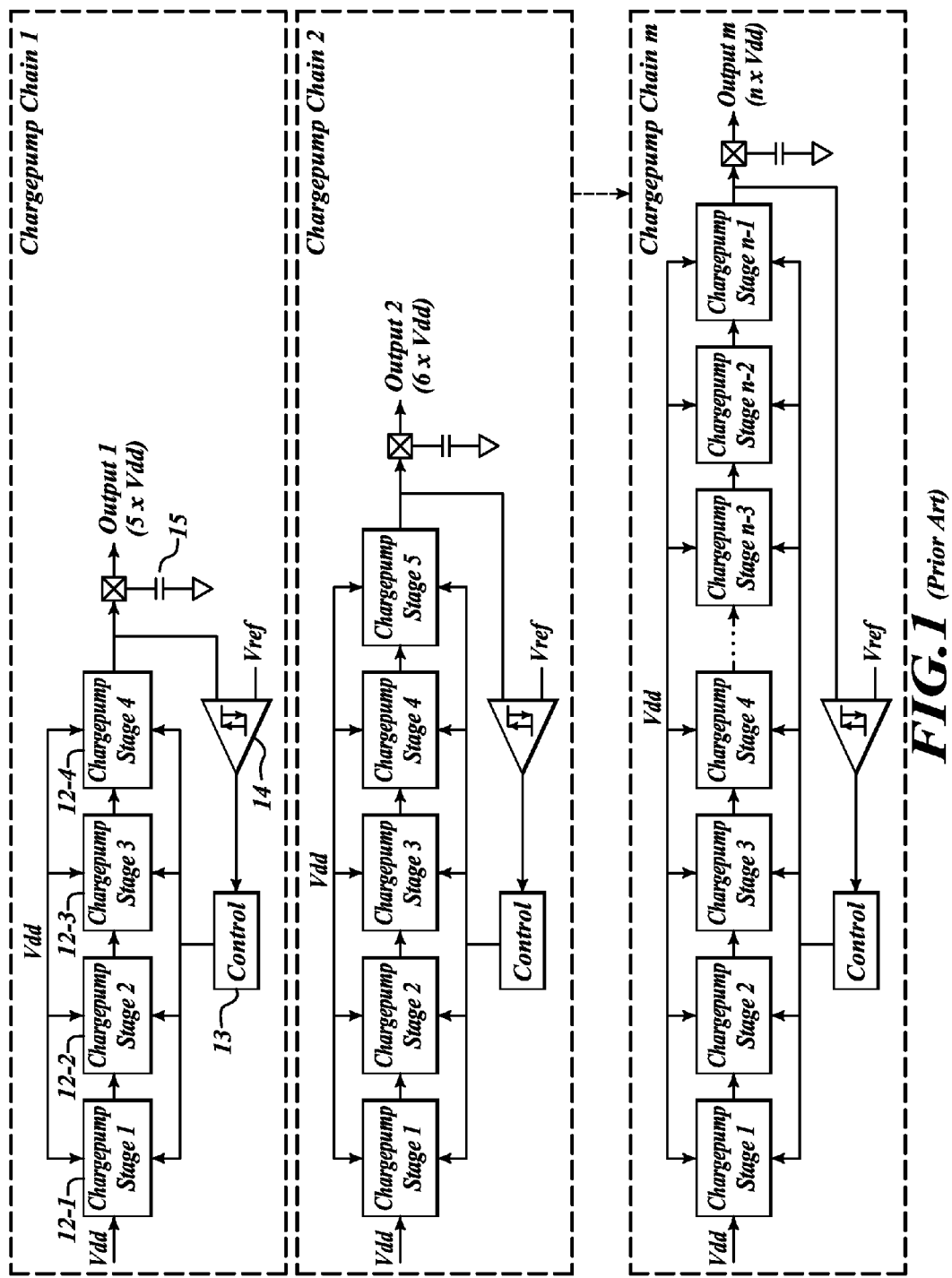
FIG. 1 is an electrical schematic showing a charge pump circuit conventional in the prior art.
Figure 2:
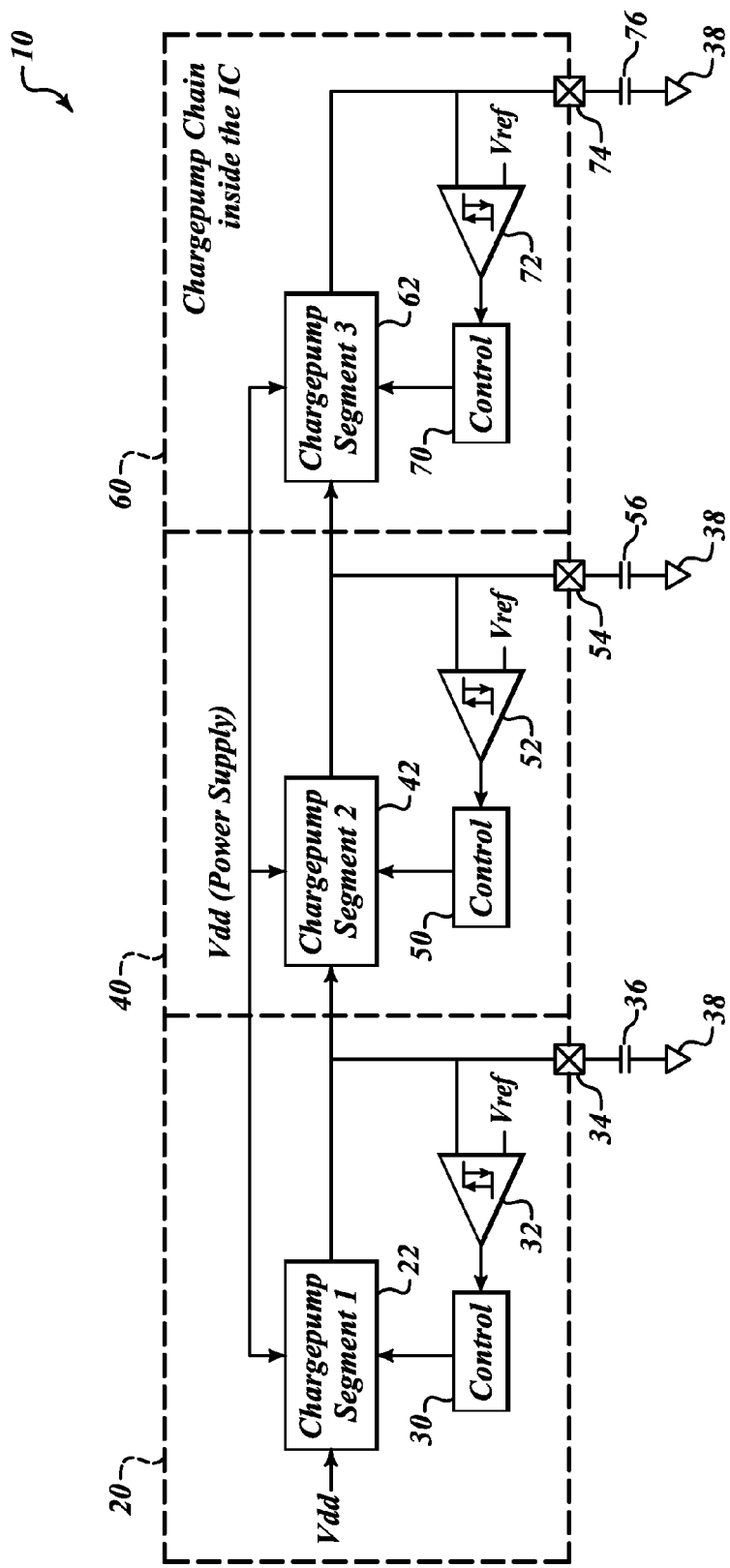
FIG. 2 is an electrical schematic showing a charge pump circuit in accordance with one embodiment of the present invention.

FIG. 2 shows a charge pump circuit 10 according to one embodiment of the present invention. The charge pump circuit 10 includes a first voltage output circuit 20, a second voltage output circuit 40, and a third voltage output circuit 60. The first, second, and third voltage output circuits 20, 40, 60 are electrically coupled in series with the one another in ascending order.

The first voltage output circuit 20 includes a first charge pump segment 22, a first control component 30, a first comparator 32, a first output node 34, and a first decoupling capacitor 36. The first charge pump segment 22 has at its input an input voltage $V_{dd}$ and has at its output the first output node 34. Also connected to the first output node 34 is a first input to the first comparator 32. A second input of the first comparator 32 is connected to a reference voltage. An output of the first comparator 32 is connected to an input of the first control component 30. An output of the control component 30 is connected back to the first charge pump segment 22, completing a regulated voltage control loop. The first output node 34 is connected to a ground 38 through the first decoupling capacitor 36. The first output node 34 is also connected to an input of the second voltage output circuit 40.

The second output circuit 40 has components and circuitry corresponding to the first voltage output circuit 20. The second output circuit 40 includes a second charge pump segment 42, a second control component 50, a second comparator 52, a second output node 54, and a second decoupling capacitor 56. The input to the second charge pump segment 42 is the first output node 34 from the first voltage output circuit 20. The second charge pump segment 42 also has as its power supply voltage $V_{dd}$ as an input.

The components of the second voltage output circuit 40 are electrically connected to one another in a way similar to the one used for the components of the first voltage output circuit 20. The second charge pump segment 42 has at its input the first output node 34 and has at its output the second output node 54. Also connected to the second output node 54 is an input to the second comparator 52. A second input to the comparator 52 is connected to a reference voltage. An output of the second comparator 52 is connected to an input of the second control component 50. An output of the second control component 50 is connected back to the second charge pump segment 42 completing a separate regulated voltage control loop. The second output node 54 is connected to ground 38 through the second output decoupling capacitor 56. The second output node 54 is also connected to an input of the third voltage output circuit 60.

In this embodiment, the components and circuit connections of the third voltage output circuit 60 correspond to the components and circuit connections of the first and second voltage output circuits 20, 40. The third output circuit 60 includes a third output node 74, which is the output of the final stage of the charge pump chain 10.

In this embodiment, the charge pump chain 10 is configured to provide three regulated voltage outputs, each output at a different voltage level. The first voltage output circuit 20 operates in two ways: as a fully regulated voltage output circuit and also as an input stage to another charge pump circuit. It provides an operational voltage at a first level at the first voltage output node 34. A load, such as a high speed logic, low voltage logic clock circuit or other electronic component may be coupled to the regulated output 34 and driven during circuit operation. In addition, the second voltage output circuit 40 takes as its starting input the voltage output from the first voltage output circuit 20, i.e., the voltage at the first voltage output node 34. The second charge pump segment 42, the second control component 50, and the second comparator 52 operate in substantially the same way as in the first voltage output circuit 20. The second voltage output circuit 40 provides a regulated voltage at the second voltage output node 54 at a second voltage level that is above that of the first level. The regulated voltage node 54 is also used to provide power to a load on the same integrated circuit, such as to the address gates, digital logic, voltage level shifters or other functional circuits. The effect of the second voltage output circuit 40 taking the output voltage of the first voltage output circuit 20 as its input is that the number of stages required to achieve the second voltage level is reduced by the number of segments in the first voltage output circuit. Among the benefits of this difference is the reduction in die space and circuit complexity needed to provide the higher voltage level achieved at the output of the second voltage output circuit 40.

There is no negative impact to using the first voltage output node as an input voltage of the second output node 54 because the voltage level at each of the output nodes 34, 54 is controlled independently of one another by their circuits' respective control component and comparator. The only consequence of the second voltage output circuit 40 taking the output voltage of the first voltage output circuit 20 as its input occurs if working load at node 34 at the output of the first voltage output circuit 20 draws a large current so that the node 34 temporarily falls below the expected voltage level. This is compensated for in the circuit as explained later herein.

The third voltage output circuit 60 takes as its input the regulated voltage output from the second voltage output circuit 40, i.e., the voltage at the second regulated voltage output node 54. The third charge pump segment 62, the third control component 70, and the third comparator 72 operate in substantially the same way as in the first and second voltage output circuits 20, 40. The third voltage output circuit 60 provides the final regulated voltage at the third voltage output node 74 at a third voltage level that is above that of the first and second voltage levels. The regulated voltage may be used to drive the word lines, column lines, body voltage or other circuits often used for memory, whether DRAM, SRAM, Flash or EEPROM.

Figure 3:
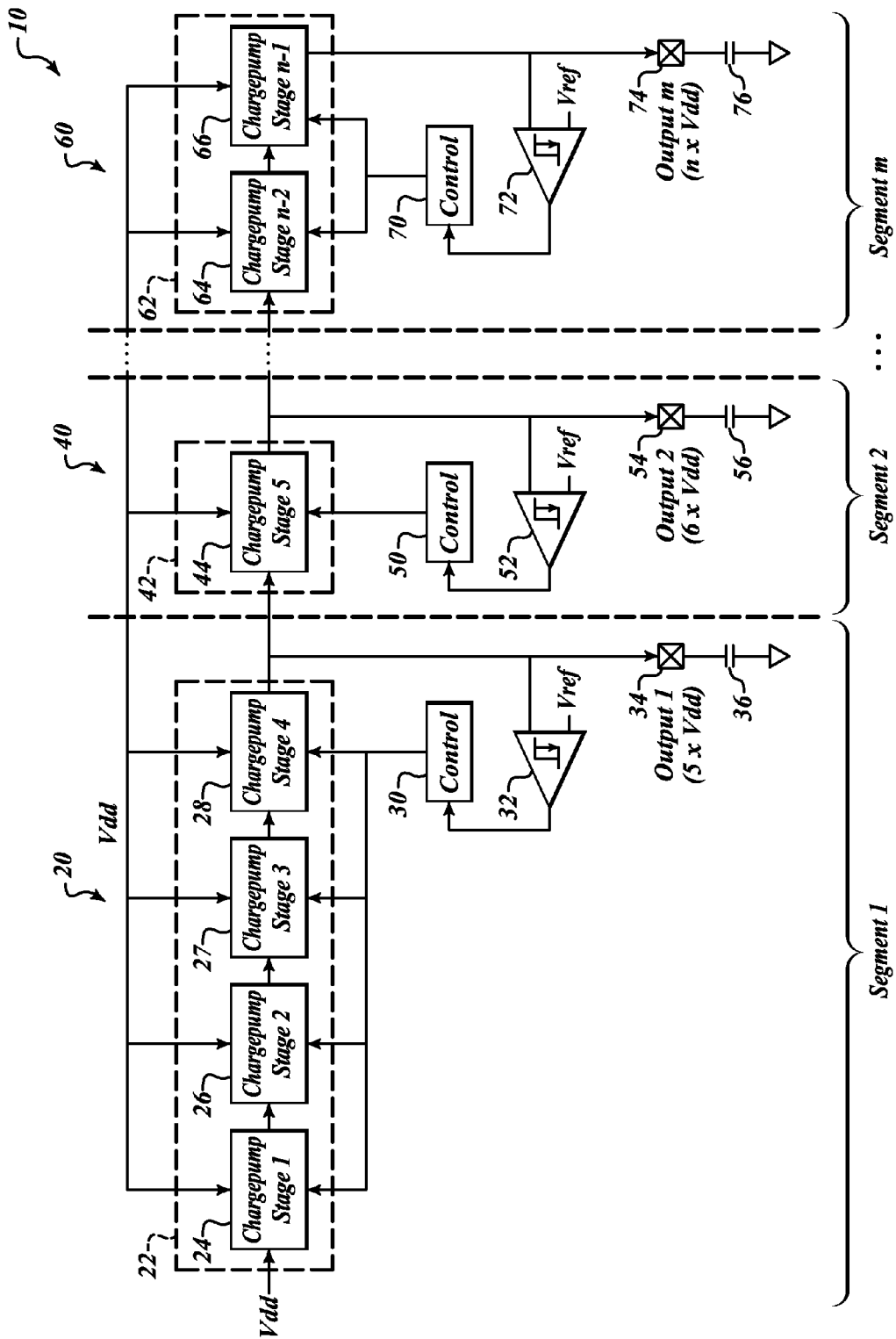
FIG. 3 is a detailed electrical schematic of the charge pump circuit of FIG. 2.

FIG. 3 shows in further detail the components of the charge pump circuit 10, in particular the charge pump segments 22, 42, 62. The first output circuit 20 includes four individual charge pump stages 24, 26, 27, 28 that together make up the first charge pump segment 22. The individual charge pump stages 24, 26, 27, 28 that make up the first charge pump segment 22 are coupled electrically in series with the output of one charge pump stage serving as the input of a subsequent charge pump stage. The initial charge pump stage 24 has the input voltage $V_{dd}$ as its input. The output of the fourth charge pump stage 28 is connected to the first output node 34. Each of the charge pump stages 24, 26, 27, 28 has as an input both the output of the first control component 30 and the input voltage $V_{dd}$.

In this embodiment, the second charge pump segment 42 of the second voltage output circuit 40 has only one individual charge pump stage 44. The third charge pump segment 62 of the third output circuit 60 has two individual charge pump stages 64, 66. In other embodiments there may be a different number of individual charge pump stages that make up each charge pump segment and there may be a different number of voltage output circuits. Independent of the number, each individual charge pump stage includes as its inputs an input voltage $V_{dd}$, a control component input, and an output of a previous charge pump stage, and includes as its outputs the input of the next charge pump stage.

The voltage level at each voltage output node is the voltage level at the input of the first stage of the segment plus the magnitude of the input voltage $V_{dd}$ times the number of stages in the segment, or $V_{out}=V_{in}+(n*V_{dd})$, where n equals the number of stages in the segment. In this embodiment, the first output circuit includes four charge pump stages. Therefore, the output at the first output node 34 equals $5V_{dd}$. The second output circuit 40 includes only one charge pump stage 44 in its charge pump segment 42. Therefore, the output voltage at the second output node 54 equals $6V_{dd}$. Generically then, the number of charge pump stages needed to provide a desired voltage level is $n=(V_{out}-V_{dd})/V_{dd}$.

Regulation of the voltage at each output node is controlled by the comparator and the control circuit in each voltage output circuit of that output node. The control circuit and comparator within each segment work to control and maintain the expected voltage level at the output node of its segment. Individual charge pump stages within a segment pull charge from either the previous charge pump stage or from the voltage input $V_{dd}$ to provide the needed voltage at subsequent charge pump stages to maintain the overall desired output voltage at the output of that segment. The same holds true for combined voltage output circuits 20, 40, 60. For example, the second control component 50 and the second comparator 52 work to maintain the desired voltage at the second output node 54. The second charge pump segment 42 must provide the charge to maintain the voltage at the second output node 54. As the source for providing this power, the second charge pump segment 42 has the output of the first output circuit 20 and the input voltage $V_{dd}$. Depending on the power available at the first output node 34, the second charge pump segment 42 may draw charge from the first output node 34 or from the input voltage $V_{dd}$ at the second charge pump segment 42. This operation also holds true in the third output circuit 60 where the third charge pump segment 62 may draw charge from the second output node 54 or from the input voltage $V_{dd}$ provided at the individual charge pump stages 64, 66 of the third charge pump segment 62 as needed to maintain the expected output voltage at the third output node 74. The decoupling capacitors 36, 56, 76 coupled between each of the output nodes 34, 54, 74 and ground 38 may have capacity to source or sink charge in order to smooth out time dependent fluctuations in the voltage level at the output nodes, but are not a continuous source of power to feed subsequent charge pump stages.

In one example scenario, during steady state DC voltage supply, the output voltage of the third voltage output circuit 60 drops below a regulation threshold level sensed by the third comparator 72. In this case the third control component 70 causes the third voltage output circuit 60 to draw charge from the second voltage output circuit 40. By doing so, this may cause the voltage level at the second output node 54 to drop, triggering the second voltage output circuit 40 to source charge to maintain the voltage level sought by the second comparator 52. The operation of the charge pump chain 10 continues in this manner to maintain the expected voltage level at each of the output nodes 34, 54, 74.

As an alternative to providing power at every output node that a constructed charge pump has available is the option to selectively disable individual output nodes. This option is useful for charge pump circuits that support multiple loads that together can draw more power than the charge pump chain 10 can provide. In this case, loads connected to each of the output nodes can be prioritized based on certain criteria. In the event that an individual voltage output circuit is not able to sustain its expected voltage, switches at the output nodes are commanded to disable voltage output nodes supplying less critical loads so that the voltage output circuit can provide its charge to a more critical output node in a different voltage output circuit. For example, in a startup sequence, a plurality of load elements connected to a number of output nodes may have varying degrees of criticality. For the less critical load elements, those outputs to which they are connected may be selectively turned off to provide more power at output nodes connected to more critical load elements. This capability may also be valuable in a shutdown sequence or in a power saving mode.

Figure 4A:
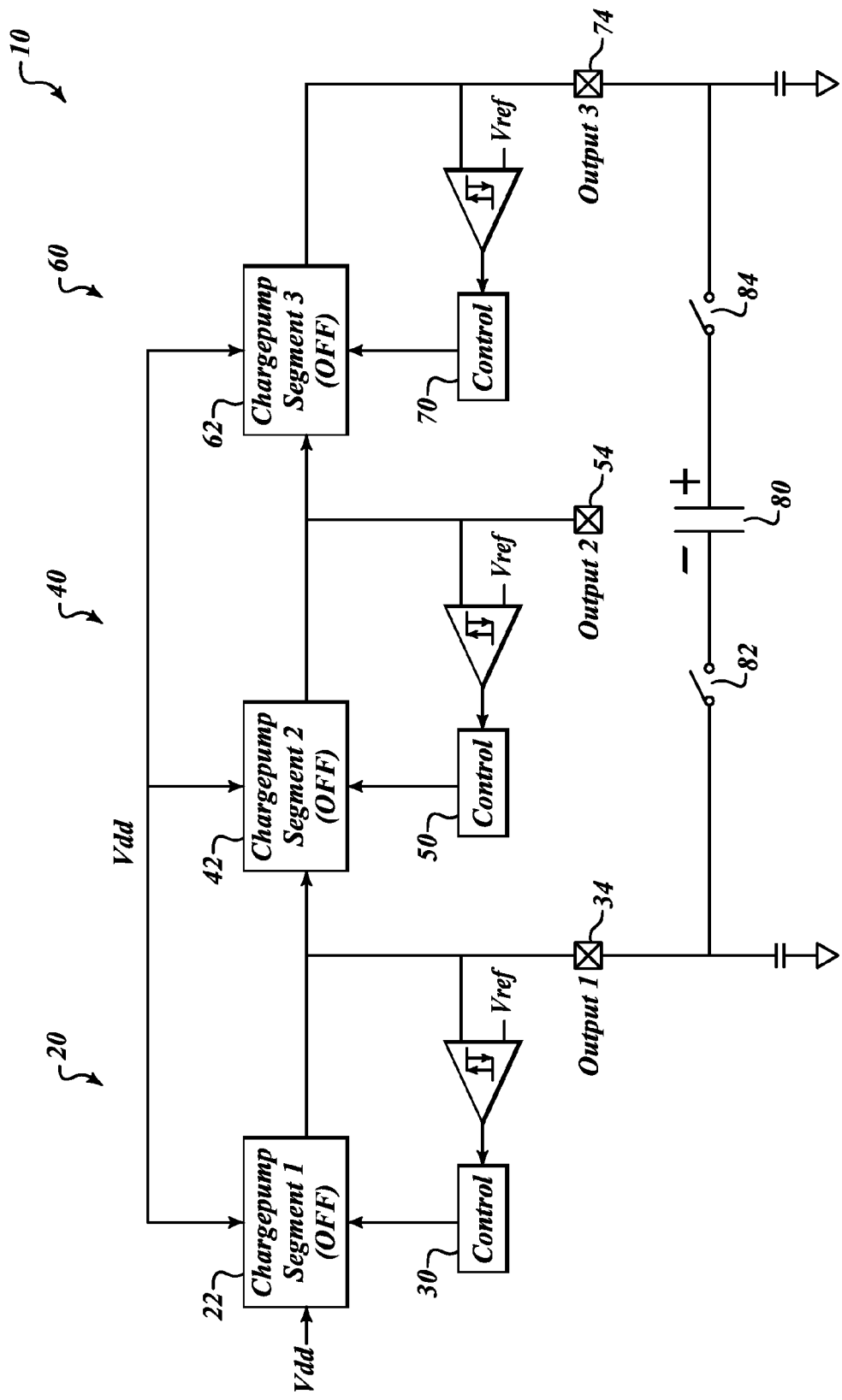
FIGS. 4A-4C are electrical schematics showing a charge pump circuit including a load element in accordance with one embodiment of the present invention.
Figure 4B:
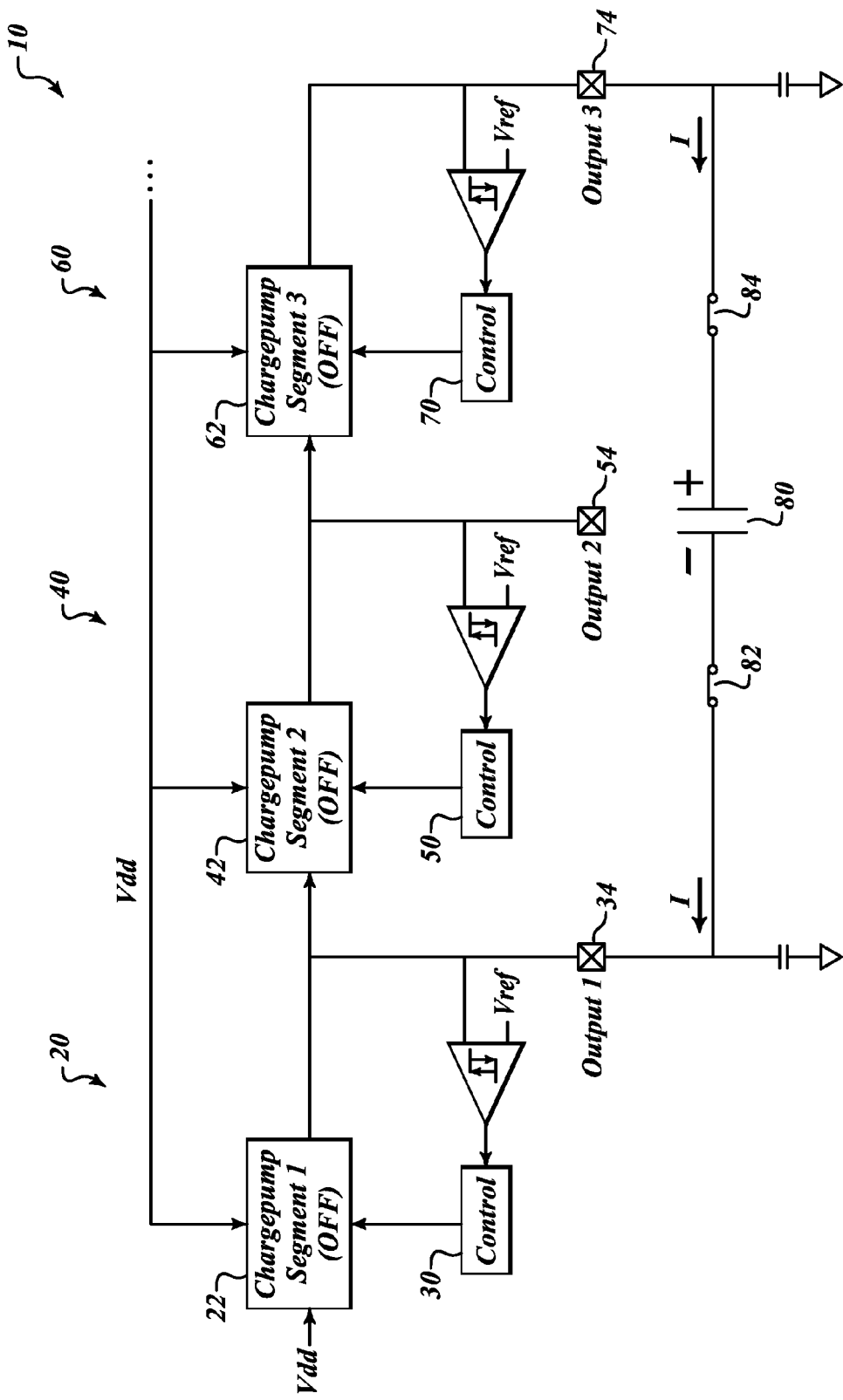
Figure 4C:
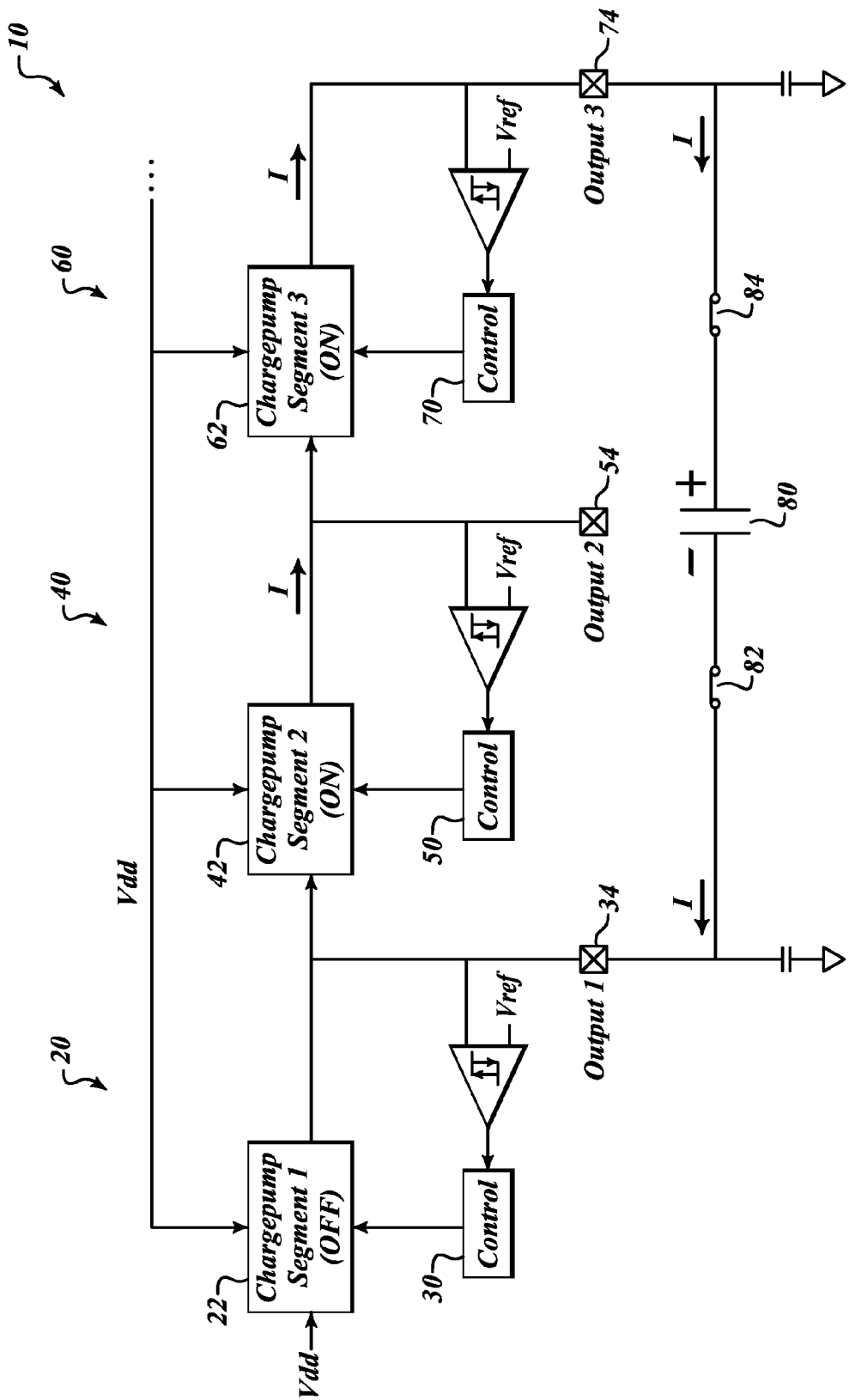

FIGS. 4A-4C show the response of the charge pump circuit 10 over time with a capacitive load 80 connected across the first and third output nodes 34, 74. In one embodiment, the capacitive load 80 is a liquid crystal display for an LED output. In series with the capacitive load 80 are two switches, a first switch 82 and a second switch 84. The first switch 82 is connected between the capacitive load 80 and the first output node 34. The second switch 84 is connected between the capacitive load 80 and the third output node 74.

FIG. 4A shows the response of the circuit at a first step before the first and second switches 82, 84 are closed. In this step the capacitive load 80 is not charged because the first and second switches 82, 84 are open. No current flows through the capacitive load 80 and the voltage level at the third voltage output node 74 is maintained. All three charge pump segments 22, 42, 62 are turned off because no charge is moving in the circuit.

FIG. 4B shows the response of the charge pump circuit 10 at a second step when the first and second switches 82, 84 are closed. When the switches are closed, charge is drawn from the third voltage output node 74 to drive the load 80. The load current passes through the capacitive load 80 and is received at the first voltage output node 34, experiencing a drop in potential through the load 80. In the initial time period after the switches 82, 84 are closed, the voltage at the third output 74 drops due to the outflow of charge unanticipated by the third control component 70. During this initial time period, the voltage at the first output node 34 increases due to the inflow of charge unanticipated by the first control component 30. Until the first and third control components 30, 70 respond to the respective addition and loss in current, the voltage levels at the first and third voltage output nodes 34, 74 are higher and lower, respectively, than the expected levels. All three charge pump segments 22, 42, 62 are still turned off because in the initial time period after the switches close, the control components have not had sufficient time to respond to the change in voltage levels.

FIG. 4C shows the response of the charge pump circuit 10 at a later time. Due to the sensed drop in voltage at the third voltage output node 74, the third control component 70 turns the third charge pump segment 62 ON to provide charge to the third output node 74. In response to the series connected third charge pump segment 62 pulling load from the second voltage output node 54, the voltage level at the second voltage output node 54 drops. In response to the voltage drop, the second control component 50 turns ON the second charge pump segment 42. The second charge pump segment 42 pulls charge from the first output node 34 which has received charge from the capacitive load 80 through the first switch 82. In this way, the charge pump circuit 10 recycles charge through the capacitive load 80, raising the potential of the recycled charge in the second and third charge pump segments 42, 62, using the input voltage $V_{dd}$. This allows the first charge pump segment 22 to remain turned off, as shown in FIG. 4C. If the recycled charge at the first output node 34 is sufficient to support the expected potentials at the second and third voltage output nodes 54, 74, this alleviates the need for the first charge pump segment 22 to turn ON. This saves the power that would normally be provided by the input voltage $V_{dd}$ to power the first charge pump segment 22, resulting in a power savings. This embodiment of the charge pump circuit 10 minimizes the input power required because not all segments need to be operated in order to maintain the voltage at subsequent outputs. This embodiment also reduces the required current carrying capacity of conductors in earlier charge pump segments of the chain because not all charge provided to later segments in the chain must be delivered through the initial charge pump segments. This permits the various stages to be made with small components.

This embodiment also demonstrates the charge pump circuit's ability to recycle and reuse charge. If there is unused charge held within charge pump stages or segments, the held charge can be transferred to previous or subsequent stage or segments. This process minimizes input power requirements and losses, making the charge pump more efficient.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electrical apparatus comprising:
    a plurality of charge pump segments, each segment having a respective input terminal and a respective output terminal, the plurality of segments coupled electrically in series to form a charge pump chain;
    a voltage input node at the input terminal of an initial segment of the chain;
    a first voltage output node at the output terminal of a final segment of the chain;
    a second voltage output node at the output terminal of a selected non-final segment of the chain;
    a first voltage regulation circuit communicatively coupled with the first voltage output node and the final charge pump segment and configured to regulate the final charge pump segment to maintain a voltage level at the first voltage output node;
    a second voltage regulation circuit communicatively coupled with the second voltage output node and the selected non-final segment of the chain and configured to regulate the selected non-final charge pump segment to maintain a voltage level at the second voltage output node; and
    a circuit having a switch coupled to the first voltage output node, the circuit configured to selectively supply current to the selected non-final segment of the chain from the output terminal of the final charge pump segment of the chain.

2. The electrical apparatus of claim 1, further comprising a third voltage output nodes located at the output terminal of a second selected non-final segment of the chain.

3. The electrical apparatus of claim 2, further comprising a third voltage regulation circuit communicatively coupled with the third voltage output node and the second selected non-final charge pump segment and configured to regulate the second selected non-final charge pump segment to maintain a voltage level at the third voltage output node.

4. The electrical apparatus of claim 1, wherein the first and second voltage regulation circuits each include a comparator and a control circuit, a first input of the comparator coupled to the voltage output node of the charge pump segment the regulation circuit is configured to regulate, a second input of the comparator coupled to a reference voltage, an output of the comparator coupled to an input of the control circuit, and an output of the control circuit coupled to the said charge pump segment.

5. The electrical apparatus of claim 1, further comprising an electrical load connected across two selected voltage output nodes.

6. The electrical apparatus of claim 5 wherein the connected electrical load is capacitive.

7. The electrical apparatus of claim 1 further comprising a switch at least one voltage output node configured to disable the output node as a source for electrical power.

8. A method for providing a voltage source comprising:
    raising an initial voltage level to a plurality of higher voltage levels using series-connected charge pump stages;
    outputting the plurality of higher voltage levels at output nodes in a plurality of selected charge pump stages;
    regulating the voltage levels at the output nodes in the plurality of selected charge pump stages;
    providing the regulated voltage level at the output nodes as power sources for electrical loads; and
    supporting the regulated voltage level at the output node of at least one selected stage by adding current to the output node that is received from an output node of a higher voltage level in the series of charge pump stages in the chain through an electrical circuit connected between the two output nodes.

9. The method of claim 8 wherein the regulated voltage level at the output node of the selected stage is supported without receiving current from the selected intermediate stage.

10. The method of claim 9 wherein the regulated voltage level at the output node of the selected stage is supported by recycling current from the connected electrical load.

11. The method of claim 8, further comprising selectively disabling individual output nodes using one or more switches according to the priority of loads connected to the output nodes and the available power of the voltage source.

12. The method of claim 11 wherein the selective disabling of output nodes is conducted as part of a start-up operation of the connected load.

13. The method of claim 8 wherein regulating a voltage level at an output node of at least one selected intermediate stage includes:
    receiving current from the selected intermediate stage;
    sending current to a subsequent charge pump stage in the chain;
    receiving current from an electrically coupled capacitor;
    sending current to an electrically coupled capacitor;
    receiving current from an electrically coupled load; and
    sending current to an electrically coupled load.

14. A system for providing a plurality of voltage levels comprising:

means for raising an initial voltage level to a plurality of incrementally higher voltage levels, each incrementally higher voltage level at a different node along an electrical circuit;
means for regulating the incrementally higher voltage levels at each of a selected plurality of nodes of the electrical circuit;
means for connecting an electrical load to the selected plurality of nodes; and
a means for supporting the voltage level at least one of the selected plurality of nodes by adding current from an additional one of the selected plurality of nodes having a voltage level higher than the voltage level at the at least one of the selected plurality of nodes to the at least one of the selected plurality of nodes via a connected load.

* * * * *